United States Patent
Fraley, II et al.

(10) Patent No.: US 6,550,723 B2
(45) Date of Patent: Apr. 22, 2003

(54) REMOVABLE CABLE TIE

(75) Inventors: John Francis Fraley, II, Rochester, MN (US); Brian Joseph Stanczyk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/740,990

(22) Filed: Dec. 21, 2000

(65) Prior Publication Data

US 2002/0079409 A1 Jun. 27, 2002

(51) Int. Cl.⁷ .................................................. F16L 3/12
(52) U.S. Cl. ........................................ 248/74.3; 248/70
(58) Field of Search ....................... 248/74.3, 64, 74.2, 248/70; 24/16 PB, 30.5 P (56) References Cited

U.S. PATENT DOCUMENTS

| | | | | |
|---|---|---|---|---|
| 3,214,808 A | * | 11/1965 | Litwin ............................ 24/16 |
| 4,457,095 A | * | 7/1984 | Stevenson ................... 43/25.2 |
| 4,766,651 A | * | 8/1988 | Kobayaski et al. ....... 24/16 PB |
| 5,135,188 A | * | 8/1992 | Anderson et al. .......... 248/74.3 |
| 5,598,994 A | * | 2/1997 | Olewinski et al. ............ 248/73 |
| 5,921,510 A | * | 7/1999 | Benoit et al. ................. 248/71 |
| 5,926,921 A | * | 7/1999 | Benoit ...................... 24/16 PB |
| 6,105,908 A | * | 8/2000 | Kraus ........................ 248/74.3 |
| 6,149,109 A | * | 11/2000 | Stankowski ................ 248/74.3 |
| 6,186,451 B1 | * | 2/2001 | Benoit ....................... 248/74.3 |

* cited by examiner

*Primary Examiner*—Ramon O. Ramirez
*Assistant Examiner*—A. Joseph Wujciak, III
(74) *Attorney, Agent, or Firm*—Rabin & Berdo, P.C.; Robert H. Berdo, Jr.

(57) ABSTRACT

A cable tie includes a strap having first and second ends. A head is disposed on the first end. The head has a slot for receiving the second end so as to form the strap into a loop. The head further has an device for engaging the second end of the strap so as to retain the strap in the form of the loop. A hooking arrangement is connected to the head for engaging with a holding member when the hooking arrangement is pushed in a first direction. The hooking arrangement freely releases the holding member when the hooking arrangement is pulled in a second direction opposite to the first direction. The hooking arrangement allows the cable tie to be repeatedly attached to, and removed from, the holding member while the strap is retained in the form of the loop.

24 Claims, 8 Drawing Sheets

REMOVABLE CABLE TIE

BACKGROUND OF THE INVENTION

1. Field of the Invention

The invention relates to a removable cable tie which can be removed from a holding member, such as a cable tie holder, while remaining attached to a component to be secured, such as a cable.

2. Background Information

Computer systems typically include a number of electrical components, such as printed circuit boards, that are electrically coupled together. One way to accomplish this is to use electrical cables to electrically join the respective electrical components. For example, the electrical cables allow electrical signals to be transmitted from one printed circuit board to another printed circuit board, so that various electronic devices on the one printed circuit board can communicate with electronic devices on the other printed circuit board. Cables are also used to supply power to and from the various electrical components.

In today's computer systems, it is typical to install the cables in predetermined orientations within the computer housing, in order to ease the assembly process, and to keep the cables out of the way of the various electrical components. In order to retain the cables in their desired orientations, it is further typical to secure the cables to either the computer housing or to other components within the housing. Securing the cables prevents the cables from inadvertently vibrating loose from the components to which they are connected. Moreover securing the cables prevents the cables from vibrating and causing undesirable noise, and possibly damaging sensitive components within the computer system. Further, by securing the cables, the cables can be retained so as to provide the interior of the housing with an uncluttered organized arrangement.

Referring to FIGS. 1–5, in order to secure the cables within the computer housing, it is conventional to use cable ties 10, 10', 10". The cable ties 10, 10', 10" (with three variations being shown in the Figures) are tightly wrapped around the respective cables (not shown), and are used to secure the cables to the housing or other components located within the housing.

Figure 1:
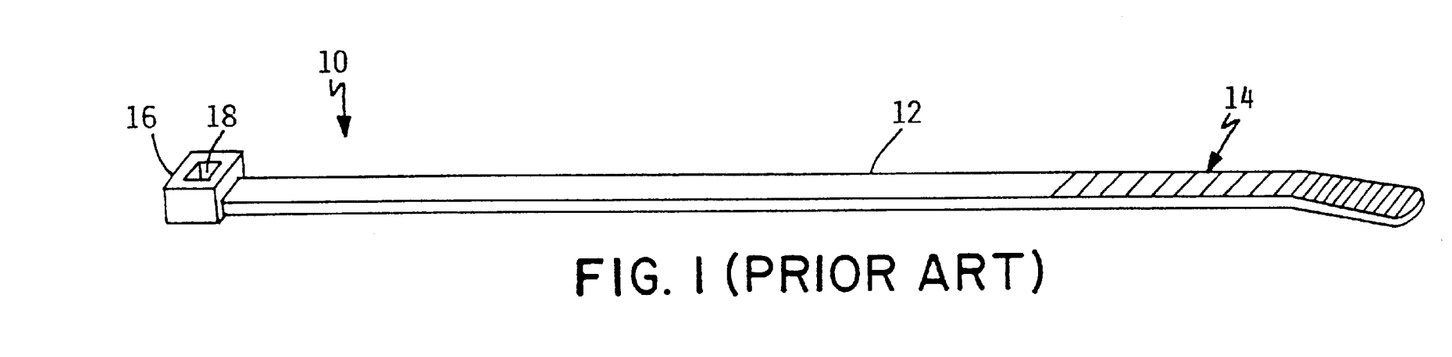
FIG. 1 is a perspective illustration of a conventional cable tie.

As shown in FIG. 1, the conventional cable tie 10 typically includes a plastic or metal strap 12, which has a free end having a plurality of ridges or teeth 14 thereon. The cable tie 10 further has a head 16 located on an opposite end of the strap 12. The head 16 has a slot 18 for receiving the free end of the strap 12, and means 20 for securing the free end when received within the slot. The means 20 is best shown in the cable tie 10" illustrated in FIG. 2.

Figure 3:
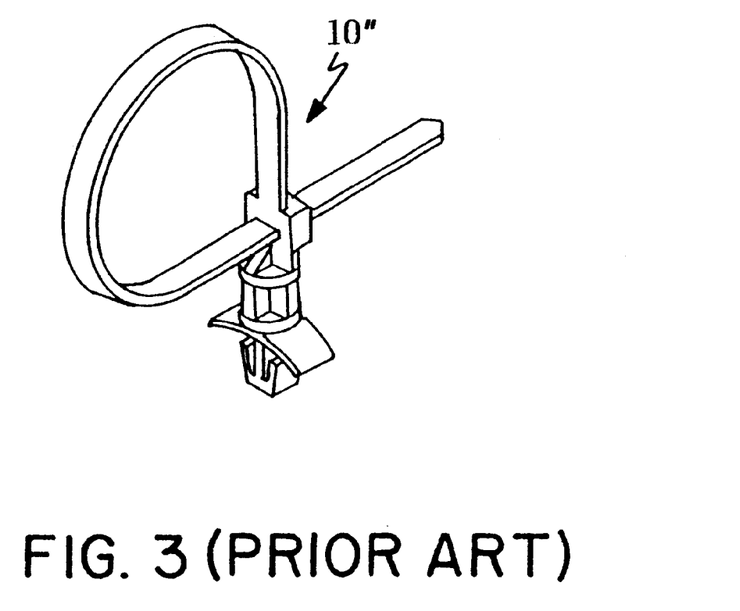
FIG. 3 is a perspective illustration of the conventional cable tie shown in FIG. 2, latched in a looped configuration.
Figure 4:
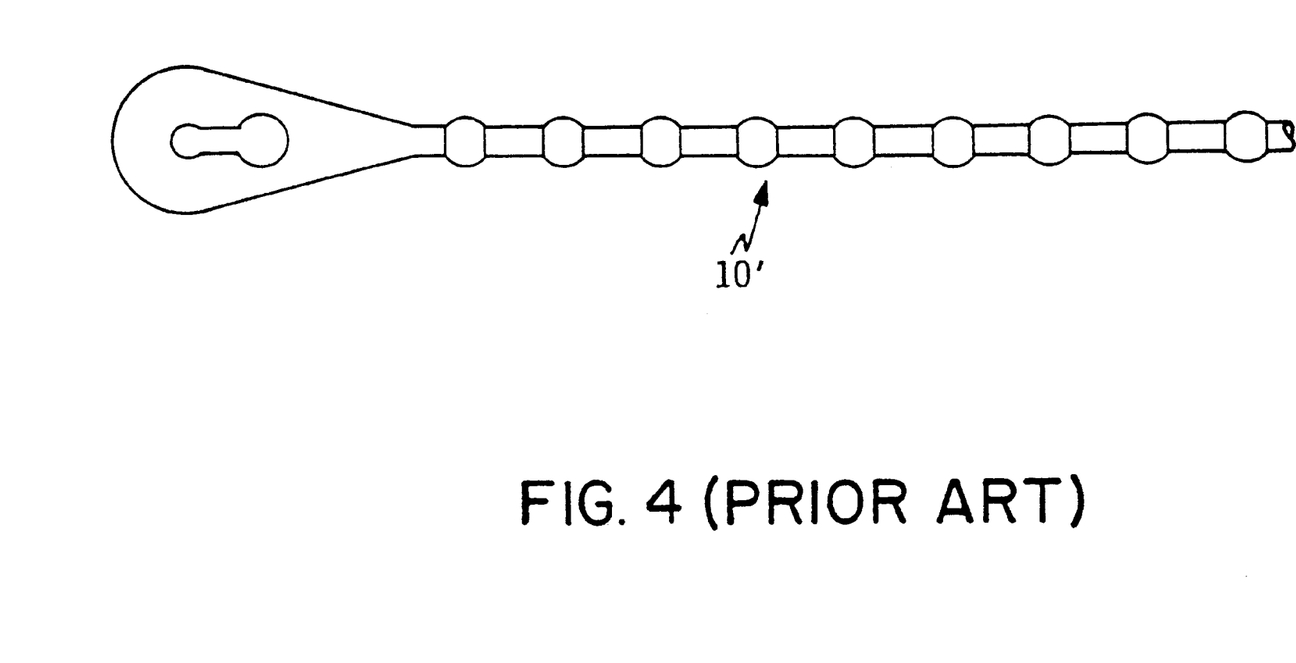
FIG. 4 is an elevational illustration of another conventional cable tie.

As is well known, in order to secure the cable tie 10 to the cable, the free end of the strap 12 is inserted through the slot 18 and pulled tight, thereby forming a loop, such as shown in FIG. 3, that can surround the cable. The securing means 20 engages with the teeth 14, thus preventing the strap 12 from being removed from within the slot 18.

Moreover, and as well known, when the cable tie 10 is looped around the cable, the cable tie may also be looped around another component, so as to secure the cable to the other component. For example, the cable tie 10 can be looped around two adjacent cables to hold the two adjacent cables securely together. Alternatively, the cable tie 10 can be used to secure the cable to a projecting tab formed in a side of the computer housing.

Figure 2:
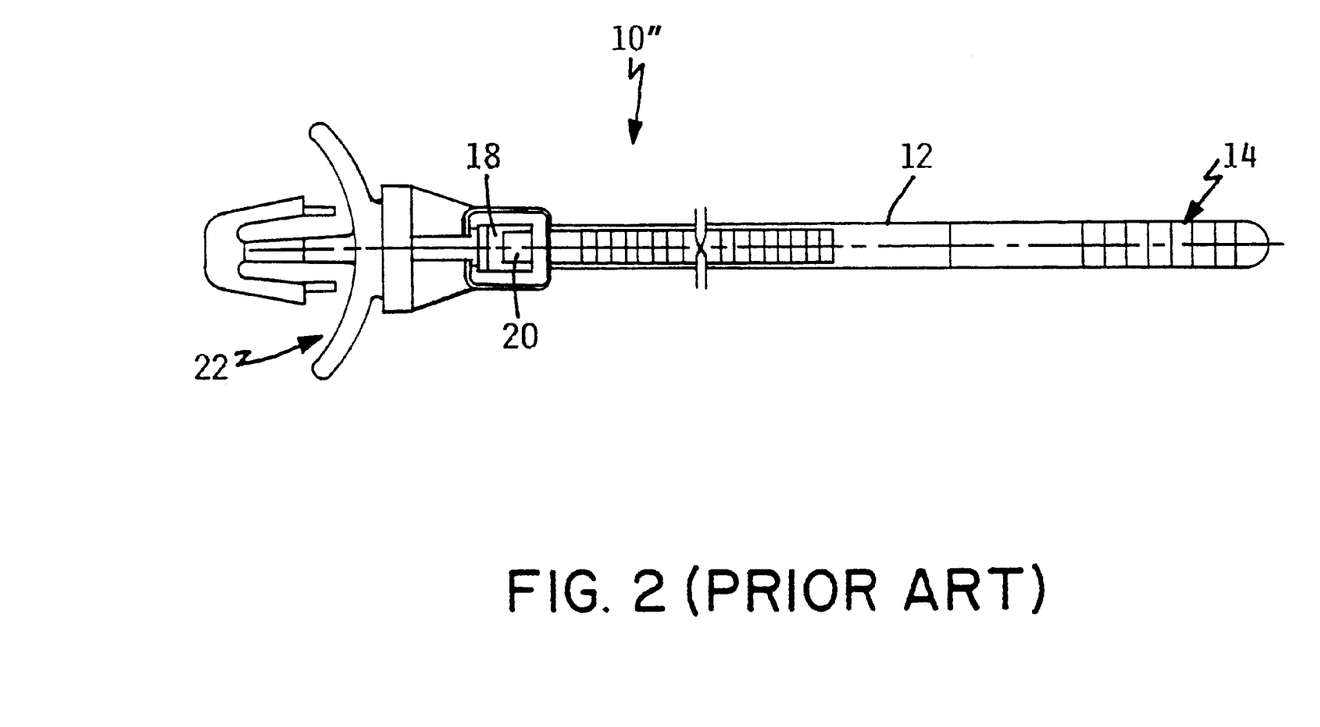
FIG. 2 is an elevational view of another conventional cable tie.
Figure 5:
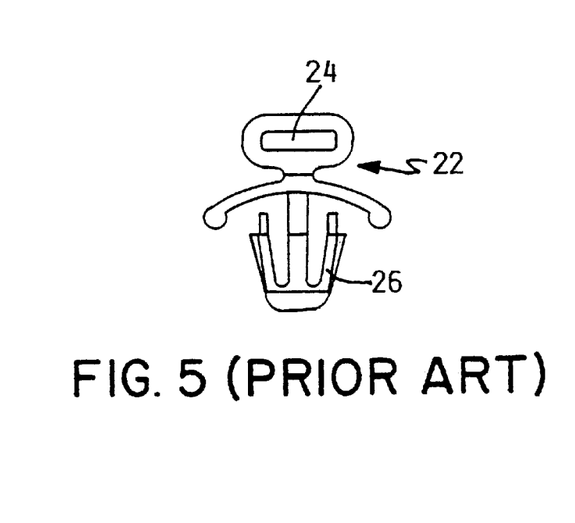
FIG. 5 is an elevational illustration of a conventional cable tie holder.

It is also known to use a so-called cable tie holder 22, as shown in FIG. 5, to secure the cable tie 10 to the computer housing, for example. The cable tie holder 22 conventionally has a projecting tab with a slot 24 formed therein, which is configured to receive the cable tie 10 so as to allow the cable tie to be fastened thereto. Alternatively, it is also known to integrally form the cable tie holder 22 directly to the cable tie, for example, by locating the cable tie holder on the head of the cable tie, as shown in FIG. 2.

The conventional cable tie holder 22 includes means for fastening the cable tie holder to the housing. Such means can include an adhesive back (not shown) which can be glued directly to the inside wall of the computer housing. Alternatively, the means may include a snap-prong device 26, which is insertable through a hole formed within the wall of the computer housing. However, in either case, the cable tie holder 22 is typically designed for a one-time use. That is, once the cable tie holder 22 is attached to the computer housing, it is not designed to be removed and reused. For example, the adhesive backing typically can only be used one time to adhere the cable tie holder to the housing. Further, it is often difficult, if not impossible, to remove the snap-prong device 26 of the cable tie holder from the hole formed within the housing without damaging the cable tie holder.

Due to space constraints within the computer housing, and in order to ease the assembly process, the cable ties are often pre-wrapped around the cable, and in specific locations, with a tie holder pre-attached thereto. That is, due to the limited space within the computer housing, it may be difficult to pull the cable ties tightly around the cable after the cable is placed in the housing. Moreover, individually wrapping each cable tie around the cable and through a respective cable tie holder is time-consuming. Therefore, when the computer manufacturer orders a cable, the manufacturer may also designate precisely where the cable ties are to be located on the cable, and which type of cable tie holder to use. Thus, when received, the cable ties will be pre-secured to the cable, with a desired cable tie holder attached thereto. Therefore, the computer manufacturer can easily secure the cable in place simply by positioning the cable in the desired location, and securing the cable tie holders in a conventional manner. This allows the cables to be quickly assembled into the computer system.

However, this known approach has the problem of requiring that the cable ties and/or the cable tie holders be cut or destroyed in order to remove the cable. That is, since the cable tie is typically permanently attached to the cable tie holder, and since the cable tie holders are typically not suitable for re-use, it is conventional to destroy the cable tie holder and/or the cable tie during the removal process. Thus, new cables must be provided, which is costly, or new cable ties and cable tie holders must be repositioned in the pre-designated locations on the cable, which increases the assembly time, and decreases productivity.

It is also known to use a cable tie having a head that includes means that allows the free end of the cable tie to be released, allowing it to be removed from the cable. However, these cable ties tend to be more expensive, and do not solve the problem of requiring the cable tie to be precisely relocated on the cable after its removal from the cable, or easing the assembly process. That is, if this cable tie is removed from the cable, access must be provided in order to wrap the cable tie around the cable, as well as to pull the cable tie tightly around the cable.

SUMMARY OF THE INVENTION

It is, therefore, a principle object of this invention to provide a removable cable tie.

It is another object of the invention to provide a removable cable tie that solves the above-mentioned problems.

These and other objects of the present invention are accomplished by the removable cable tie disclosed herein.

According to one aspect of the invention, a cable tie is provided with a hooking arrangement that allows the cable tie, while looped and latched around a cable, for example, to be releaseably attached to a holding member. The hooking arrangement is preferably integrally formed as part of the cable tie, for example as part of the head of the cable tie. The hooking arrangement allows the looped and latched cable tie to be removably secured to the holding member so as to prevent movement of the cable tie.

The hooking arrangement, in an exemplary aspect of the invention, includes two projecting legs, which are joined to each other at a base to form an open U-shaped latching configuration. In the exemplary embodiment, the legs are essentially parallel to each other, and arranged to extend essentially at a right angle to the unlooped strap (i.e., essentially parallel to a direction in which the slot extends). This configuration allows the hooking arrangement to be easily engaged with the holding member.

In a further aspect of the invention, the respective legs of the hooking arrangement preferably have a size which allows at least one of the legs to be received within a similarly-sized slot formed in the holding member. Further, in another exemplary aspect of the invention, the legs have a rectangular cross-sectional profile corresponding to a shape of the slot within the holding member, so as to easily fit within the slot of the holding member with a minimum of free play.

In another aspect of the invention, the legs of the hooking arrangement may be configured to extend in a same direction as the non-looped strap (i.e., essentially perpendicular to a direction in which the slot within the head extends), so that the hooking arrangement can be pressed over a tab formed in the computer housing, for example, to engage it thereto. Other configurations of the hooking arrangement are within the spirit and scope of the invention. However, in all configurations, it is preferred that the hooking arrangement is easily removed from the device to which it is latched, simply by pulling on the legs.

In another exemplary aspect of the invention, instead of having a U-shaped configuration, the hooking arrangement can have an L-shaped configuration. With this arrangement, the leg of the L is insertable through the slot formed within the cable tie holder or through a tab or rung formed in the side of the computer housing. This configuration requires less material to make the hooking arrangement, and may be easier to use in certain computer systems.

In another exemplary aspect of the invention, the legs of the hooking arrangement are provided with projections at their respective ends. The projections help to ensure that the hooking arrangement is not inadvertently disengaged from the cable tie holder, for example. Moreover, when the hooking arrangement is provided with two legs, the projections will preferably face each other, allowing the hooking arrangement to be clipped onto a variety of different components, any of which could then be termed as a holding member. For example, the hooking arrangement could be clipped to an adjacent cable, with the projections helping to secure the hooking arrangement thereto. Alternatively, the projections could be inserted into the slot within the cable tie holder or tab from opposite sides thereof, so that the projections face each other from across the slot. Alternatively, the slots formed in the cable tie holder or tab can be eliminated, with the projections pinching the holding member to secure the cable tie in place. Other arrangements are within the scope of the invention.

In use, the cable tie is positioned and looped around a cable in a known manner. The hooking arrangement can then be engaged with a respective holding member disposed within the computer system, by pushing the hooking arrangement toward the holding member, causing the leg or legs to slide within the slot of the holding member, or otherwise engaging the holding member in the manners previously described. If the cable needs to be removed from the housing, the hooking arrangement is simply pulled away from the holding member, so that the holding member remains in the desired location within the housing, and with the cable tie remaining in the desired location on the cable. Thus, after removal, the cable can be easily reused without any further reworking thereof.

DETAILED DESCRIPTION OF THE PREFERRED EMBODIMENTS

The invention will now be described in more detail by way of example with reference to the embodiments shown in the accompanying figures. It should be kept in mind that the following described embodiments are only presented by way of example and should not be construed as limiting the inventive concept to any particular physical configuration.

Further, and if used and unless otherwise stated, the terms "upper", "lower", "front", "back", "over", "under", and similar such terms are not to be construed as limiting the invention to a particular orientation. Instead, these terms are used only on a relative basis.

Figure 6:
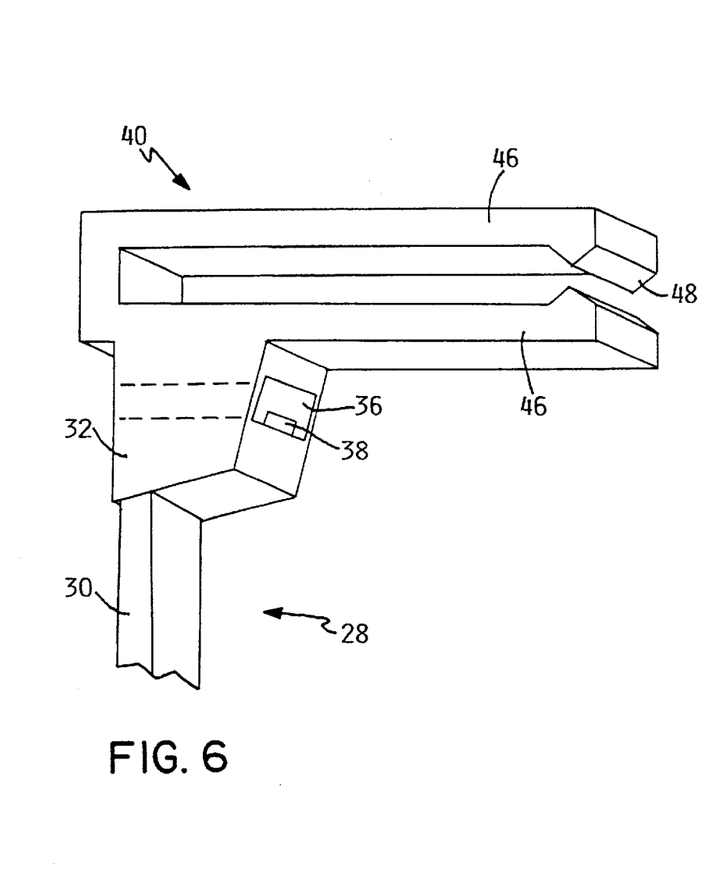
FIG. 6 is a partial perspective view of a removable cable tie, in accordance with an exemplary aspect of the invention.
Figure 7:
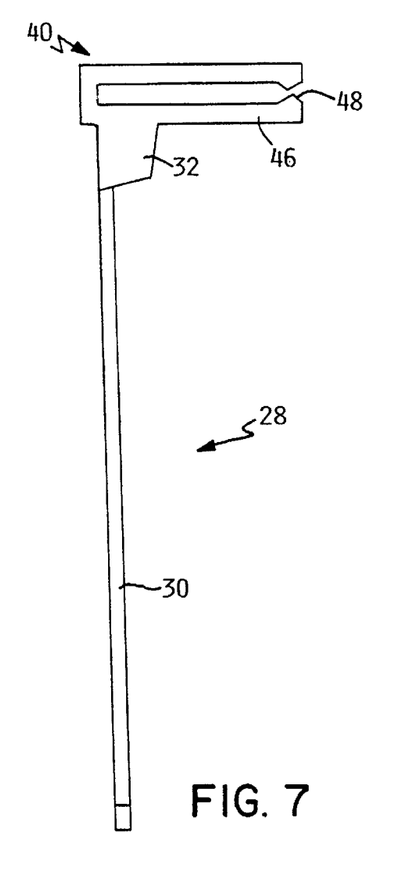
FIG. 7 is an elevational view of the removable cable tie shown in FIG. 6.

Referring to FIGS. 6 and 7, a cable tie 28 according to the present invention improves upon the conventional cable ties shown in FIGS. 1–4. The cable tie 28 in accordance with an exemplary aspect of the present invention may include a strap 30 having a head 32 on one end thereof, which engages with the free end of the strap. This portion (i.e., head and strap) of the cable tie 28 can have any of a number of conventional configurations. For example, and as illustrated, the strap 30 may have an essentially flat, elongated, rectangular configuration with a number of teeth or ridges 34 on a free end thereof (see FIG. 8), similar to the conventional cable tie 10 shown in FIG. 1.

Further, as is well known in the art, the head 32 may have a slot 36 for receiving the free end of the strap 30. The head 32 may include securing means 38 within the slot 36 which allows the free end to be inserted within the slot, but which engages with the teeth 34 to prevent the removal of the free end of the strap from the slot. As is conventional, the securing means 38 may be, for example, a prong which projects across the slot 36 and which engages with the respective teeth 34 in the manner of a ratchet. Of course, the present invention is not limited to this particular configuration. Instead, the present invention can be utilized with any type of strap, head and securing means as are well known in the art.

For example, the cable tie according to the present invention can also have a conventional release mechanism (not shown) provided in the head that allows the prong to be disengaged from the teeth, to allow the free end of the strap to be removed from the slot. The present invention may also have a plurality of rungs disposed on the strap which engage with a worm gear mechanism (not shown), disposed within or on the head of the cable tie. Alternatively, the present invention may have a strap similar to the cable tie 10' shown in FIG. 4, which has a plurality of beads integrally formed along the strap, which engage with a tapered slot formed in the head. As is apparent, the concept of the present invention is utilizable with any and all types of cable ties.

In the exemplary embodiment shown in FIGS. 6 and 7, the cable tie 28 is formed from plastic. Alternatively, the cable tie may be formed of metal, or other materials, within the scope of the invention.

Figure 8:
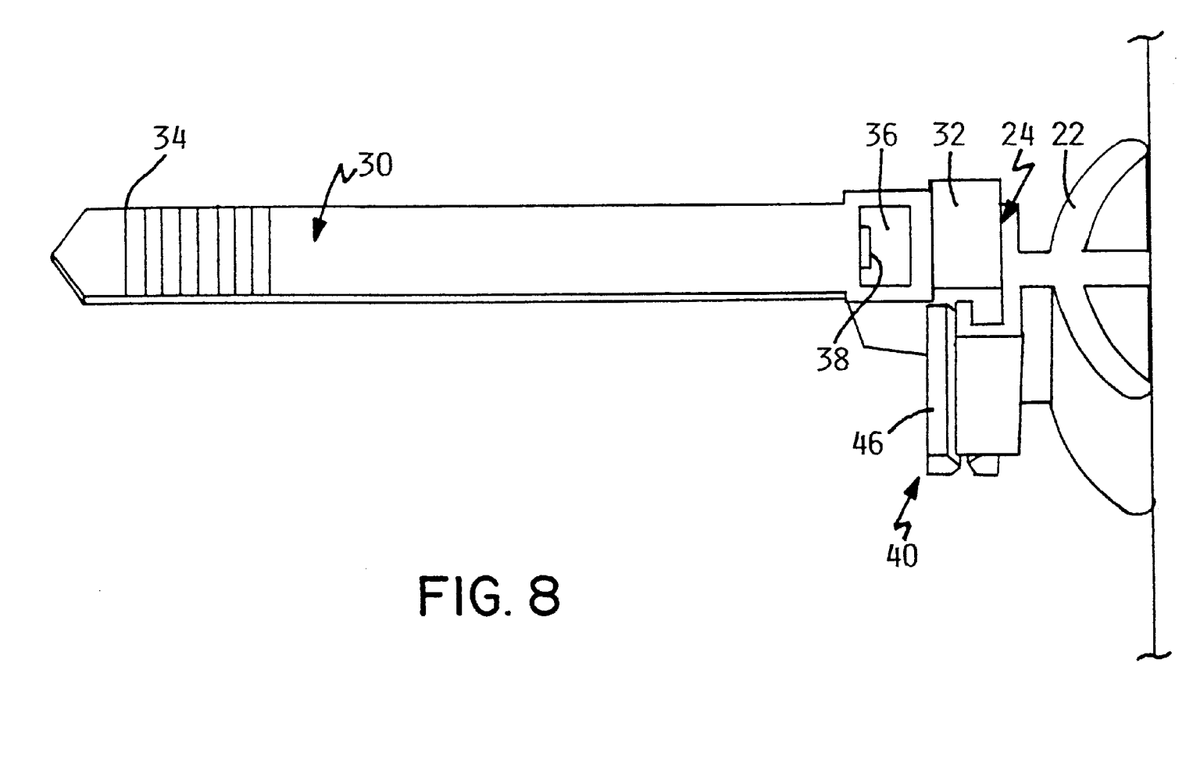
FIG. 8 is a perspective view of the removable cable tie shown in FIGS. 6 and 7, attached to a conventional cable tie holder.
Figure 9:
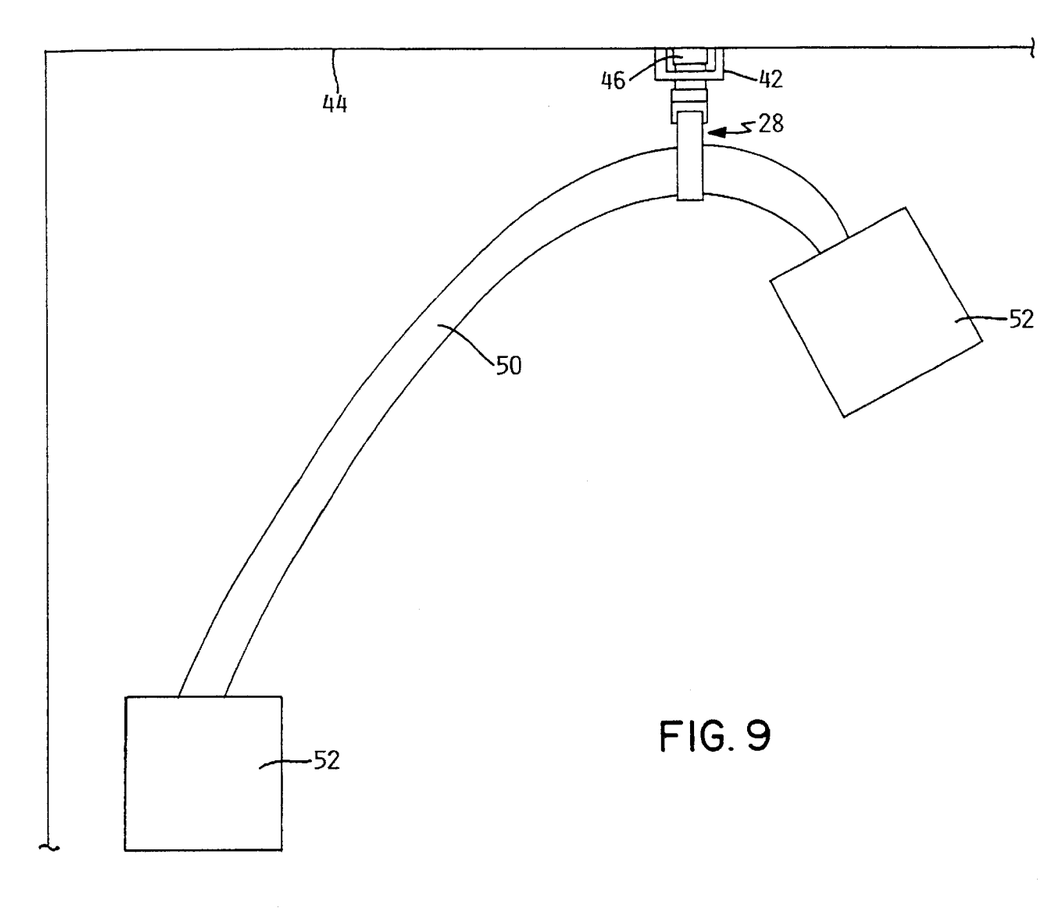
FIG. 9 is a partial elevational view of a computer system, having a cable secured with a removable cable tie in accordance with an exemplary aspect of the present invention.

The present invention further includes a hooking arrangement 40 that allows the cable tie 28, when looped and latched around a cable, for example, to be releaseably attached to a holding member, such as a conventional cable tie holder 22 (FIG. 8), or a tab 42 formed, for example, directly in a side of the computer housing 44 (FIG. 9). The hooking arrangement 40 is preferably integrally formed as part of the cable tie 28, for example, as part of the head 32 of the cable tie. The hooking arrangement 40, when removably secured to the holding member, prevents movement of the cable tie 28.

The hooking arrangement 40, in the exemplary embodiment, comprises two projecting legs 46, which are joined to each other at a base to form an open U-shaped latching configuration. In the exemplary embodiment, the legs 38 are essentially parallel to each other, and arranged to extend essentially at a right angle to the unlooped strap 30 (i.e., essentially parallel to a direction in which slot 36 extends). This configuration allows the hooking arrangement 40 to be easily engaged with a slot 24 formed within the conventional tie holder 22, or with the tab 42 formed in the side of the housing 44.

As best shown in FIG. 8, since the slot 24 formed within the conventional cable tie holder 22 is typically adapted to receive the strap of a cable tie, the respective legs 46 of the hooking arrangement 40 preferably have a size which allows at least one of the legs to be received within the slot 24. Further, in the exemplary illustrated embodiment, the legs 46 have a rectangular cross-sectional profile corresponding to a shape of the slot 24, so as to allow a respective leg to be received within the slot 24 with a minimum amount of free play.

Figure 10:
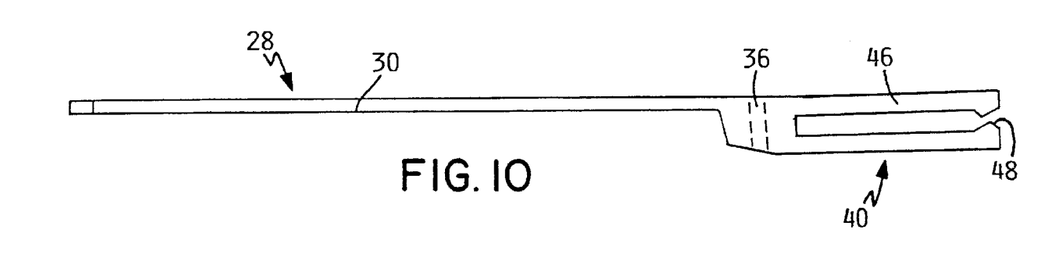
FIG. 10 is an elevational view of a further exemplary aspect of the present invention.

Referring also to FIG. 10, the hooking arrangement 40 can have other configurations without departing from the spirit of the invention. For example, the legs 46 may be configured to extend in a same direction as the non-looped strap 30 (i.e., essentially perpendicular to a direction in which the slot 36 extends), so that the hooking arrangement 40 can be pressed over a tab formed in the computer housing, for example, to engage it thereto. Other configurations of the hooking arrangement 40 are within the spirit and scope of the invention. However, in all configurations, it is preferred that the hooking arrangement 40 can be easily removed from the device to which it is latched, simply by pulling on the legs 46.

Figure 11:
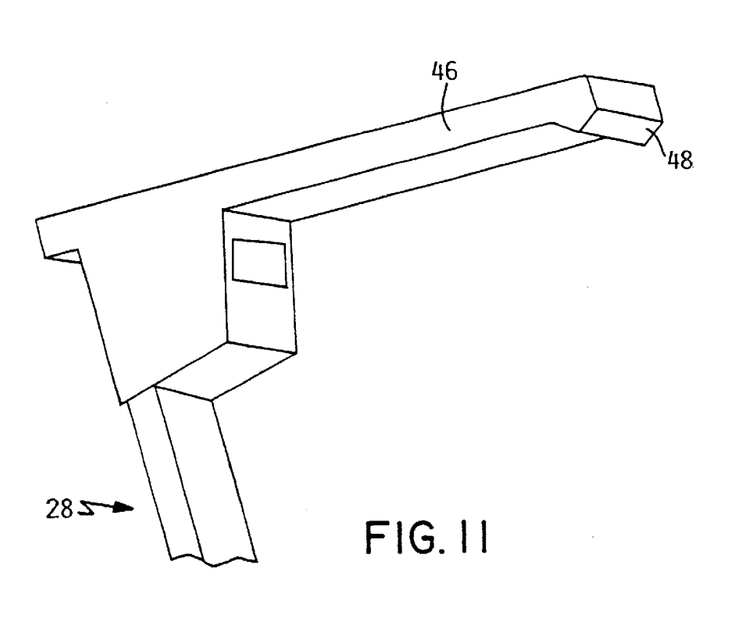
FIG. 11 is a partial perspective view of another exemplary aspect of the present invention.

Referring to FIG. 11, in another exemplary aspect of the invention, instead of having a U-shaped configuration, the hooking arrangement can have an L-shaped configuration. With this arrangement, the leg 46 of the L may be inserted through the slot formed within the cable tie holder or through a tab or rung formed in the side of the computer housing.

Preferably, the legs 46 of the hooking arrangement 40 are provided with projections 48 at their respective ends. The projections 48 help to ensure that the hooking arrangement 40 is not inadvertently disengaged from the cable tie holder 22, for example. Moreover, when the hooking arrangement 40 is provided with two legs 46 as previously described, the projections 48 will face each other, allowing the hooking arrangement to be clipped onto a variety of different components, any of which could then be termed as a holding member. For example, the hooking arrangement 40 could be clipped to an adjacent cable, with the projections 48 helping to secure the hooking arrangement thereto. Alternatively, the projections 48 could be inserted into the slot within the holding member from opposite sides thereof, so that the projections face each other from across the slot. Alternatively, the slots formed in the holding member can be eliminated, with the projections 48 pinching the holding member to secure the cable tie in place. Other arrangements are within the scope of the invention.

Referring back to FIG. 9, in use, the cable tie 28 is positioned and looped around a cable 50 in a conventional manner. The holding members, such as cable tie holders 22 or tabs 42, can likewise be pre-located, if desired, in their desired locations within the computer housing 44. When the cable 50 is positioned within the housing 44, the hooking arrangement 40 can then be engaged with a respective holding member disposed within the computer system, by pushing the hooking arrangement toward the holding member, causing the leg or legs to slide within the slot of the holding member, or otherwise engaging the holding member in the manners previously described. If the cable 50 needs to be removed from the housing, the cable is disconnected from (electrical) computer components 52, and the hooking arrangement 40 is simply pulled away from the holding member, so that the holding member remains in the desired location within the housing, and with the cable tie remaining in the desired location on the cable. Thus, after removal, the cable 50 can be easily reused without any further reworking thereof.

Although the present invention has been described in connection with a computer system, it is contemplated that the cable ties according to the present invention can be utilized in other applications. Moreover, although the name "cable tie" may imply a cable tie can only be used to secure a cable, this is not the case. For example, cable ties are often used in the automotive industry to secure a variety of different components. The present invention can facilitate the removal of automotive components secured using cable ties in a manner similar to that given above.

It should be understood, however, that the invention is not necessarily limited to the specific arrangement and components shown and described above, but may be susceptible to numerous variations within the scope of the invention.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes, and adaptations, and the same are intended to be comprehended within the meaning and range of equivalents of the appended claims.

What is claimed is:

1. A cable tie, comprising:
   a strap having first and second ends;
   a head disposed on the first end, said head having a slot for receiving the second end so as to form the strap into a loop, said head further having means for securing the second end of said strap so as to retain the strap in the form of the loop; and
   means connected to said head for engaging with a holding member when said means for engaging is pushed in a first direction, said means for engaging freely releasing the holding member when said means for engaging is pulled in a second direction opposite to the first direction, wherein said means for engaging allows the cable tie to be repeatedly attached to, and removed from, the holding member while said strap is retained in the form of the loop,
   wherein said means for engaging includes two legs joined together and being adapted to receive the holding member therebetween, and
   wherein the slot extends through the head, and wherein said legs extend essentially perpendicular to a direction in which the slot extends.

2. The cable tie recited in claim 1, wherein said legs have a rectangular cross-sectional profile.

3. The cable tie recited in claim 1, wherein each of said legs has a projection at a free end thereof, said projections facing each other.

4. The cable tie recited in claim 1, wherein the legs collectively form a generally U-shape.

5. A holding arrangement, comprising:
   a holding member including a projecting tab having a slot formed therein; and
   a cable tie, comprising:
      a strap having first and second ends;
      a head disposed on the first end, said head having a slot for receiving the second end of said strap so as to form the strap into a loop, said head further having means for securing the second end of said strap so as to retain the strap in the form of the loop; and
      means for engaging with said holding member when said means for engaging is pushed in a first direction, said mean for engaging being connectable to said projecting tab using the slot of said projecting tab, said means for engaging freely releasing said holding member when said means for engaging is pulled in a second direction opposite to the first direction, wherein said means for engaging allows the cable tie to be repeatedly attached to, and removed from, said holding member while said strap is retained in the form of the loop.

6. The holding arrangement recited in claim 5, wherein said means for engaging includes at least one leg that is insertable into the slot of said projecting tab.

7. The holding arrangement recited in claim 6, wherein said leg includes a projection at a free end thereof, said projection engaging with said projecting tab when said leg is inserted into the slot thereof.

8. The holding arrangement recited in claim 5, wherein said means for engaging is connected to said head.

9. A holding arrangement, comprising:
   a holding member including a projecting tab; and
   a cable tie, comprising:
      a strap having first and second ends;
      a head disposed on the first end, said head having a slot for receiving the second end of said strap so as to form the strap into a loop, said head further having means for securing the second end of said strap so as to retain the strap in the form of the loop; and
      means for engaging with said holding member by connecting with the projecting tab when said means for engaging is pushed in a first direction, said means for engaging including two legs joined together and being adapted to receive the projecting tab therebetween, said means for engaging freely releasing said holding member when said means for engaging is pulled in a second direction opposite to the first direction, wherein said means for engaging allows the cable tie to be repeatedly attached to, and removed from, said holding member while said strap is retained in the form of the loop,
      wherein said projecting tab has a slot formed therethrough, and wherein one of said two legs is insertable into the slot of said projecting tab for releasably engaging said cable tie to said holding member.

10. The holding arrangement recited in claim 9, wherein each of said legs has a projection at a free end thereof, said projections facing each other and being engageable with said projecting tab.

11. The holding arrangement recited in claim 9, wherein said means for engaging is connected to said head.

12. A method of securing a component within a housing, comprising:
   providing a holding member having a projecting tab;
   providing a cable tie having a strap and a head disposed on one end of the strap, the head having a slot, the cable tie further having at least one projecting leg;
   wrapping the strap around a component to be secured;
   inserting a free end of the strap into the slot and retaining it therein so as to form the strap into a loop; and
   engaging the projecting leg with the projecting tab to allow the cable tie to be repeatedly attached to, and removed from, the holding member while said strap is retained in the form of the loop,
   wherein the projecting tab has a slot formed therein, and wherein said engaging includes inserting the projecting leg through the slot of the projecting tab.

13. The method recited in claim 12, wherein the at least one projecting leg comprises two projecting legs, the projecting legs receiving the projecting tab therebetween.

14. The method recited in claim 12, wherein the projecting leg is connected to the head.

15. A computer system, comprising:
   a housing;
   a plurality of electrical components disposed within said housing;

an electrical cable electrically coupling at least two of said electrical components together; and a holding arrangement including:
    a holding member disposed within the housing; and
    a cable tie looped around said cable, and including:
        a strap having first and second ends;
        a head disposed on the first end, said head having a slot for receiving the second end so as to form the strap into the loop, said head further having means for securing the second end of said strap so as to retain the strap in the form of the loop; and
        means connected to said head, for engaging with said holding member when said means for engaging is pushed in a first direction, said means for engaging freely releasing the holding member when said means for engaging is pulled in a second direction opposite to the first direction, wherein said means for engaging freely allows the cable tie to be repeatedly attached to, and removed from, the holding member while said strap is secured around the cable in the form of the loop.

16. The computer system recited in claim 15, wherein said holding member includes a projecting tab to which said means for engaging is connectable to.

17. The computer system recited in claim 16, wherein said projecting tab has a slot formed therethrough, said mean for engaging being connectable to said cable tie holder using the slot of said projecting tab.

18. The computer system recited in claim 17, wherein said means for engaging includes at least one leg that is insertable into the slot of said projecting tab.

19. The computer system recited in claim 18, wherein said leg includes a projection at a free end thereof, said projection engaging with said projecting tab when said leg is inserted into the slot thereof.

20. The computer system recited in claim 16, wherein said means for engaging includes two legs joined together and being adapted to receive the projecting tab therebetween.

21. The computer system recited in claim 20, wherein said projecting tab has a slot formed therethrough, and wherein one of said two legs is insertable into the slot of said projecting tab for releasably engaging said cable tie to said cable tie holder.

22. The computer system recited in claim 20, wherein each of said legs has a projection at a free end thereof, said projections facing each other and being engageable with said projecting tab.

23. The computer system recited in claim 16, wherein said projecting tab is formed in a wall of said housing.

24. The computer system recited in claim 15, wherein the holding member comprises a cable tie holder attached to said housing.

* * * * *